United States Patent [19]
Yates

[11] 3,724,328
[45] Apr. 3, 1973

[54] PLATEAU MILLING SCHEME FOR HYDRAULIC TRACERS

[75] Inventor: Edward W. Yates, Cincinnati, Ohio

[73] Assignee: Cincinnati Milacron Inc., Cincinnati, Ohio

[22] Filed: Nov. 4, 1971

[21] Appl. No.: 195,676

[52] U.S. Cl. .................................. 90/62 R, 251/3
[51] Int. Cl. ......................... B23c 1/16, B23q 35/18
[58] Field of Search ...90/62 R, 13 R; 251/3; 81/14 A

[56] References Cited
UNITED STATES PATENTS 2,958,501   11/1960   Pickett et al. .......................... 251/3
2,836,387   5/1958    Rosebrook ............................. 251/3

Primary Examiner—Gil Weidenfeld
Attorney—Howard T. Keiser et al.

[57] ABSTRACT

An apparatus for use with an hydraulic tracing system on a machine tool having a slide controlled by the deflection of a tracing stylus wherein there is provided a means for limiting the penetration of a cutting tool into a workpiece. The apparatus comprises means in series with a tracer control valve for shutting off fluid flow to the slide when the cutter has reached a preset penetration level and means for resetting this level.

5 Claims, 2 Drawing Figures

INVENTOR.
EDWARD W. YATES

3,724,328

PLATEAU MILLING SCHEME FOR HYDRAULIC TRACERS

BACKGROUND OF THE INVENTION

This invention relates to hydraulic profiling systems and more particularly to plateau milling schemes for depth controlled tracing systems.

Depth controlled or 180° tracing systems are well-known in the art. Only one machine slide, usually the vertical head, is controlled by the tracer while other slides operate at predetermined feed rates. The tracer unit, generally, attached to the vertical head, controls the hydraulically operated vertical slide by means of a tracer control valve which is biased by the deflection of a stylus in contact With a master or pattern.

When a deep cavity is to be hollowed out of a blank workpiece through use of a depth controlled tracing mechanism, a number of progressive cuts have to be made in order to avoid overloadinG the cutting tool. In the past this could be achieved through use of two distinct methods. First, where the machine tool is a knee and column type the cutter can be fixed at a predetermIned depth of cut by raising the knee of the machine. The milling operation is then started by engaging the table feed which initiates movement of the workpiece through the cutting zone. A low feed rate is selected to avoid overloading the cutting tool. The length of cut is determined by the tracing stylus touching the walls of a master. Incremental cuts at the same cutter setting, i.e., without moving the knee, are then taken by adjusting the horizontal position of the table in a direction perpendicular to the direction of automatic feed. When the first serieS of passes over the blank has been completed the cutter is then set for another depth of cut by adjusting the knee positiOn. This sequence is repeated until the bottom of the cavity is reached.

This first method is not applicable to a large number of hydraulic tracers in the field because it pertains only to knee and column type machines. Another method must be used with machines having a vertical head controlled by the tracing stylus, and having no positive stop for depth of cut to limit cutter penetration when machining a deep cavity. In this case, the tracer is used to actually control the path of the cutter, rather than being used merely as a pointer to guide it. The tracer unit is lowered until the stylus touches the bottom of the cavity and the cutter is sunk into the work to the depth of first cut. As the table feed is engaged, the stylus will control the position of the cutter and the length of stroke. By subsequent incremental cross adjustments in the table, and vertical adjustments of the tracing unit for progressive depth cuts, the cavity is milled by progressively reproducing the bottom contour of the cavity until full depth is reached. While both of these methods produce satisfactory results, it has been found that the most economical method of removing metal from a work blank to form a deep cavity would permit the cutter to make a pass each time that approximates the width of the cavity at a specific depth in the cavity of the template. While the first method permits this, that method is inapplicable on a large number of machines now in the field for lack of a positive depth control in the tracing unit. The present invention provides apparatus which permits use of the first method on die sinking machines having a vertical head controlled by the depth control tracing system.

SUMMARY OF THE INVENTION

The present invention provides an adjustable positive stop for depth of cut on a tracer controlled vertical head of a machine tool through use of a servo valve connected in series with the tracer control valve. The bushing of a tracer control valve and the bushing of the servo valve are secured to the head and are designed to move in unison with the vertical head. The plunger of the servo valve rests against an adjustable positive stop. As the head holding the cutter moves down in an attempt to follow the commands of the tracing stylus as it sinks into the cavity of a three dimensional template, the servo valve bushing moves with respect to the stationary plunger. When the servo valve reaches the neutral position with respect to the plunger the fluid flow causing vertical movement of the head is shut off and the cutter, which is attached to the head, maintains a fixed depth of cut.

The head remains at this fixed depth until the tracing stylus touches the walls of the cavity. This touching forces the plunger of the tracer control valve up and the biasing is reversed. The flow is now unrestricted in this direction and the head automatically moves up. Since the servo valve bushing moves in unison with the head, the valve moves with respect to the plunger and away from the neutral position. The adjustable positive stop may now be reset for successive cuts.

It should be understood that while the following description and attached drawings refer to a depth controlled tracing system, the present invention may be utilized on any tracing system wherein the machine tool slide is controlled by the deflections of a tracing stylus in contact with a master pattern or template. Any reference to depth or other direction is for illustrative purposes only.

THE DRAWINGS

DETAILED DESCRIPTION

Figure 1:
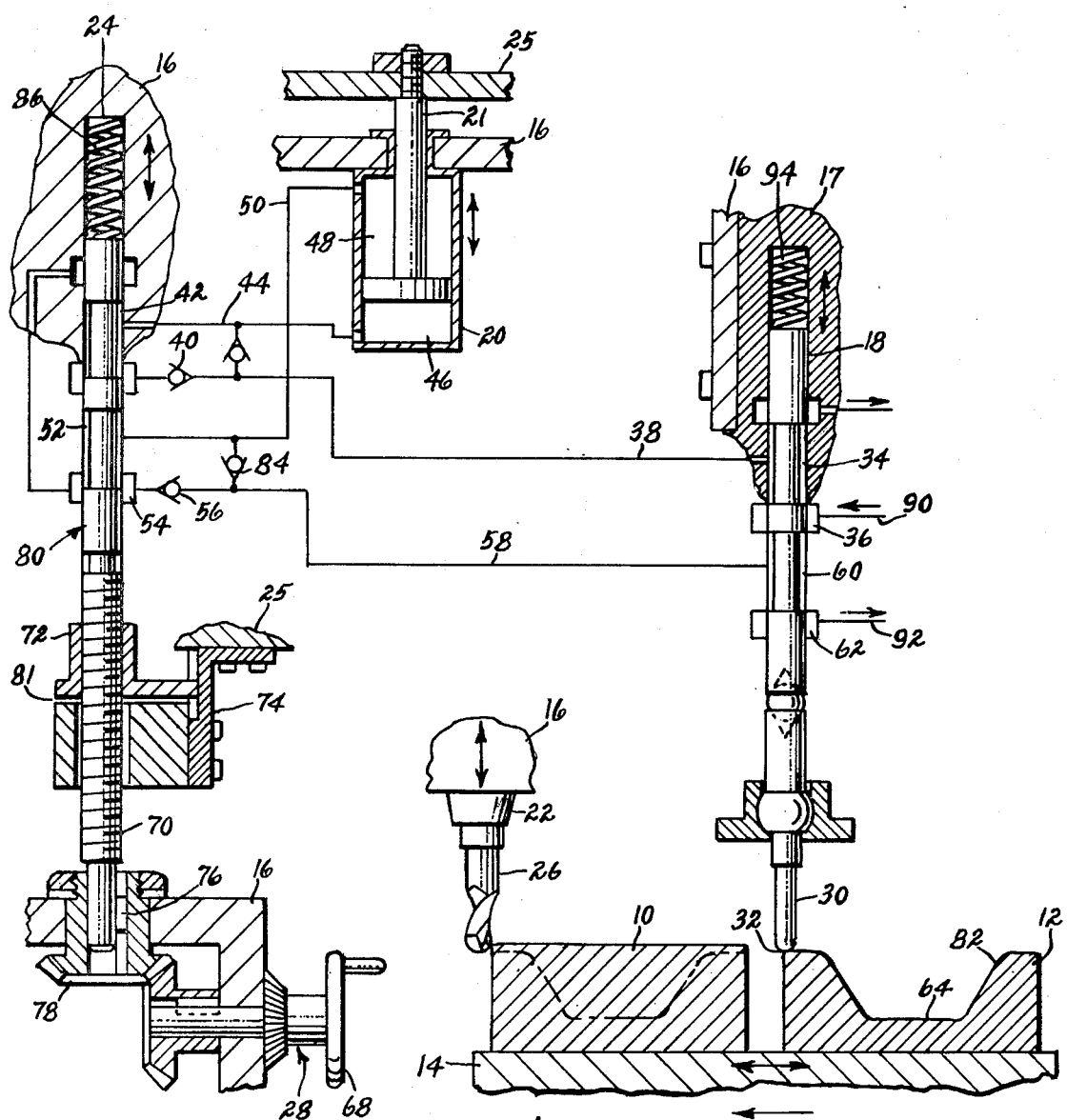
FIG. 1 illustrates the preferred embodiment of the invention.

There is shown in FIG. 1 a portion of a depth controlled tracing system. The workpiece blank 10 and template 12 are secured to a table 14. The table is powered in the well-known manner to move in two directions — left and right across the drawing as shown, and in and out of the paper toward and away from the reader. The vertical head 16 of the machine has secured to it a tracing mechanism 17. Also rigidly secured to the head 16 is the vertical cylinder 20, the rotating spindle 22, and a servo valve 24. The spindle 22 is suited to hold a rotating cutting tool 26 in the well-known manner.

A handwheel assembly 28 is also rigidly secured to the head 16 of the machine. Thus, the handwheel assembly 28 always moves with the vertical head 16.

As shown, the table is feeding to the left. The stylus 30 follows the contour of template 12 and controls the corresponding movement of the head 16 and cutter 26. Assume the stylus 30 is in contact with the template 12 at a starting point 32, and the table feeds to the left, in direction of the arrow. The stylus 30 will follow the contour of the template 12 in a downward motion. This will open the chamber 34 of valve 18 to pressure port 36. Fluid flows under pressure through line 38 and through check valve 40 into chamber 42 of the servo valve 24. Line 44 then carries the fluid under pressure into chamber 46 of cylinder 20, thus forcing the slide carrying the head 16 and cutter 26 down with respect to the piston 21 which is secured to a fixed machine base 25. Line 50 carries exhaust fluid into chamber 52 of valve 24. Since chamber 52 is open to chamber 60 through port 54 and check valve 56, the exhaust fluid is returned via line 58 to exhaust port 62. As the fluid flows in this manner, the head 16 duplicates the movement of the stylus 30.

In a typical tracing system the stylus 30 will continue to follow the template contour to the bottom 64 of the cavity. However, when die sinking a part containing a deep cavity the physical limitations of the cutter 26 often prohibit the removal of all the metal on a single pass. It is necessary, therefore, to provide positive stops controlling the cutter penetration on a single pass.

Figure 2:
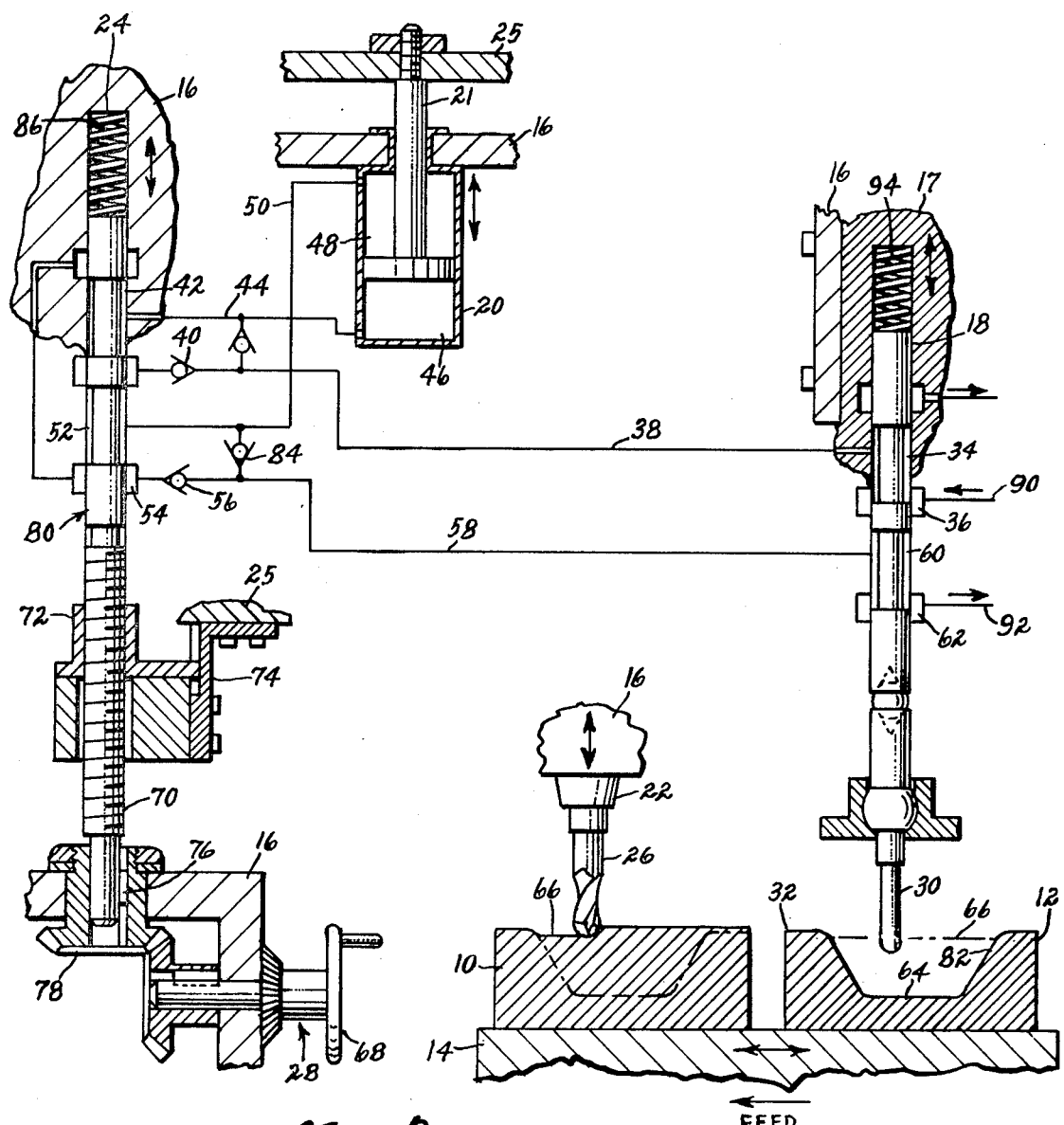
FIG. 2 illustrates the tracer mechanism of FIG. 1 during a plateau level cut.

In the present invention the positive stops are uniquely provided by an apparatus coupled in series with the tracer valve 18 for controlling fluid flow to the cylinder 20, for example, the servo valve 24. As seen in FIG. 2, the head 16 responds to the stylus 30 only until the cutter 26 reaches a predetermined depth. At this depth the tool 26 continues to cut the workpiece 10 across a plateau plane 66. The stylus 30 is allowed to hang free during this phase.

The servo valve 24 is made up of a bushing that is secured to and moves with the head 16 and a plunger 80 that is slidably secured to gear 78 of handwheel assembly 28 by means of the key 76. Thus the plunger 80 can move axially wit respect to the handwheel assembly 28.

The plunger 80 includes a threaded shaft 70 which is received by a non-rotating receptacle such as the non-rotating nut 72. The non-rotating nut 72 is slidably secured to a stop 74 which is secured to the base 25.

Thus, when the head 16 moves down in response to the stylus 30, the servo valve 24 moves in a like manner. There is a gap 81 between the nut 72 and the stop 74. The plunger 80 will move with the bushing of valve 24 until the gap 81 is closed by the contact of nut 72 with the stop 74. When this happens, the plunger 80 can no longer move downward. The head 16 continues to move downward. As the head 16 continues to move down, the ports in servo valve 24 are closed to fluid flow. This shuts off the fluid flow to cylinder 20 and maintains the cutter at a predetermined plateau level 66.

The stylus 30 will hang free once the head 16 has reached the predetermined depth plateau 66. This is, the spring 94 forces the stylus 30 to its most extended position because there are no counteracting forces on the tip of the stylus. Thus lines 38 and 58 are open to pressure and exhaust respectively, but fluid flow is shut off by plunger 80. In this manner the head 16 is held in a constant plateau plane 66 as the chambers 46 and 48 of the cylinder 20 are in equilibrium.

This plateau level is adjustable by means such as the handwheel assembly 28. It can be seen that rotation of the handwheel 68 would cause a similar rotation of shaft 70. If the system were not in the plateau region, as in FIG. 1 such a rotation would increase or decrease the gap 81 between the nut 72 and the stop 74. This would then alter the range of movement of the plunger 80 and thereby reset the plateau level 66.

When the system is operating on the plateau level 66, as shown in FIG. 2, rotation of the handwheel 68 will allow the shaft 70 and the nut 72 to move with respect to each other. Therefore, if the nut 72 is caused to move up, the plunger 70 will move down because of spring 86. This opens chamber 42 to pressure via line 38 and chamber 34 of valve 18 moving the head 16 to down causing deeper penetration by the cutter 26. If the plunger 70 is moved up, the nut 72 being against stop 74 and unable to move down, the chamber 52 is opened to pressure via line 38 and the head 16 is forced up via fluid flow through line 50. In this manner it is possible for the operator to correct the penetration level 66 while a cut is in progress.

It should be noted that the description of adjustment during plateau cutting indicates one further advantage of the preferred embodiment. If the tracing system 17 is removed from the machine and line 38 is connected directly to pressure line 90, and line 58 is connected to exhaust line 92 the system will operate manually through use of the handwheel 68. The rotation of handwheel 68 causes movement of the plunger 80 which likewise causes movement of the head 16 and cutter 26 into and out of the workpiece 10.

As illustrated in FIG. 2, the stylus 30 actually hands below the plateau level 66 when the tool 26 is cutting at the preset depth. Thus, when the stylus 30 touches wall 82, the plunger of tracer valve 18 first neutralizes the exhaust and pressure chambers before reversing them. As the table 14 continues to move to the left the stylus 30 will move up the wall 82 opening tracing valve chambers 60 and 34 to pressure and exhaust, respectively. Since line 58 is now open to pressure, the fluid flows through check valve 84 and into cylinder chamber 48 forcing the head 16 up. The tracing system now operates in the typical fashion.

While the system is operating in this typical phase and after the cutter has made the last incremental pass at the particular preset depth, the operator may reset the depth of the plateau plane by turning the handwheel 68. The operator continues to do this until the plateau level is below the deepest part of the cavity in template 12.

It should be understood that the foregoing is for illustrative purposes only and is not intended to limit the spirit of the invention or the scope of the appended claims.

What is claimed is:

1. In a hydraulic tracing system for a machine tool having a slide controlled by the deflection of a stylus in contact with a template, wherein said stylus is affixed to an end of the plunger of a tracing control valve in fluidic communication with fluid actuating means for moving said slide, an apparatus for controlling the penetration level of a cutting tool moving with said slide into a workpiece, said apparatus comprising:
 a. means in fluid series with said tracer control valve for shutting off the fluid flow to said fluid actuating means when said tool reaches the penetration level; and
 b. means associated with said fluid series means adjusting the penetration level.

2. The apparatus of claim 1 wherein said means in fluid series comprises:
   a. a servo valve bushing which moves with said slide in response to the deflections of said stylus;
   b. a plunger in said bushing, designed to remain in a fixed position when said bushing moves in response to the stylus, for controlling fluid flow to the fluid actuating means.

3. The apparatus of claim 2 wherein said adjustment means comprises;
   a. a threaded shaft affixed to one end of said plunger;
   b. a non-rotating internally threaded receptacle suited to accept said threaded shaft whereby said threaded shaft moves axially with respect to said receptacle when said shaft is rotated;
   c. means for limiting the movement of said shaft thereby holding said shaft in a fixed position with respect to said bushing; and
   d. means for rotating said shaft for causing relative axial movement between said shaft and said non-rotating receptacle.

4. The apparatus of claim 3 wherein there is further provided means for biasing said shaft for causing movement of the shaft in one direction whenever said rotating means is employed-.

5. The apparatus of claim 4 wherein said biasing means is a spring placed within said servo valve bushing and is affixed to the other end of said plunger.

* * * * *